July 13, 1954   L. J. LITALIEN ET AL   2,683,332
GLASS MOLD HAVING A DETACHABLE TWO-PART INSERT
Filed Jan. 5, 1953   2 Sheets-Sheet 1
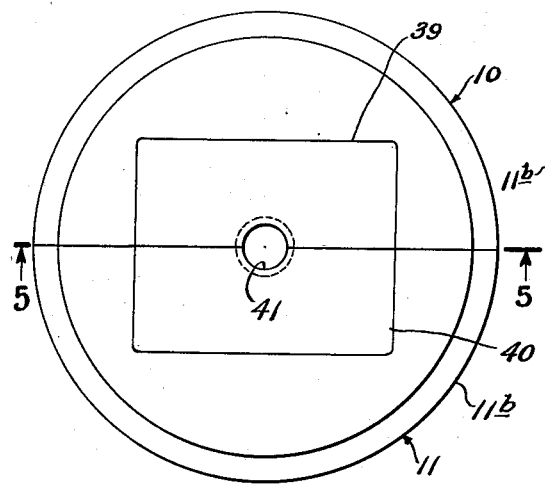
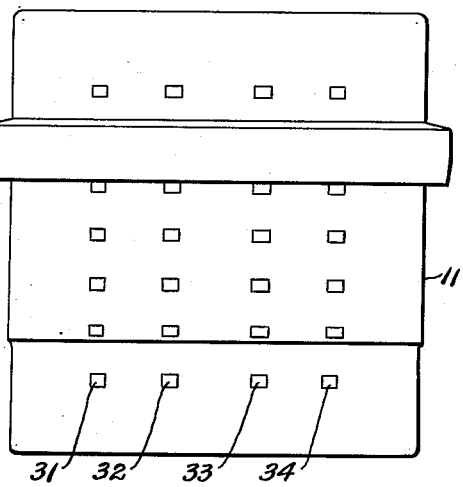
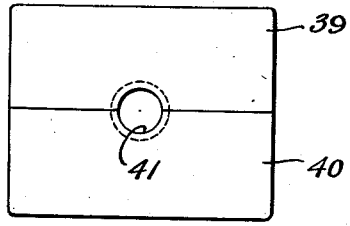
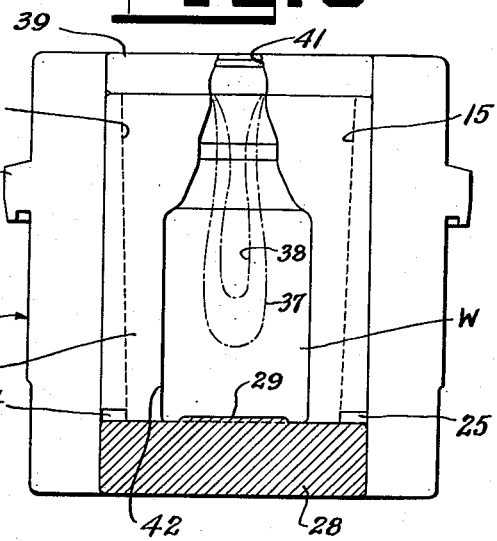
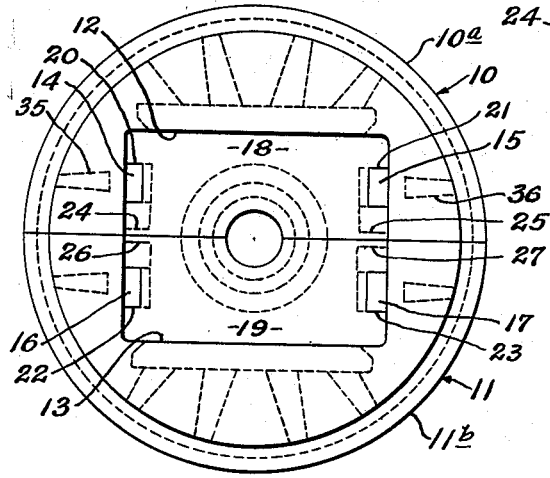
INVENTORS
LAWRENCE J. LITALIEN
BY JOSEPH DUTHAVECK
H. G. Manning
ATTORNEY July 13, 1954 L. J. LITALIEN ET AL 2,683,332
GLASS MOLD HAVING A DETACHABLE TWO-PART INSERT
Filed Jan. 5, 1953 2 Sheets-Sheet 2
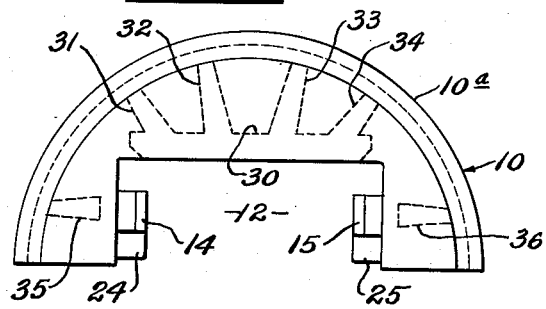
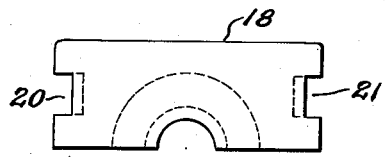
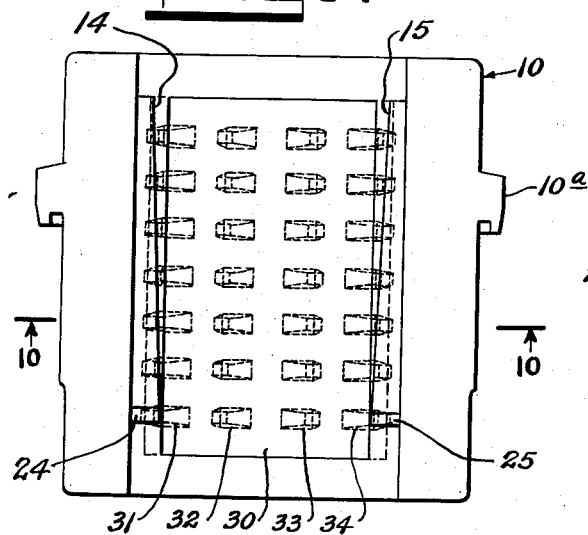
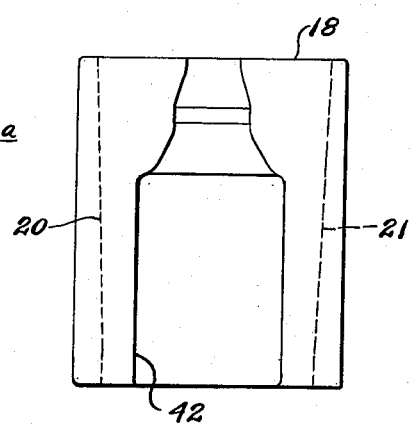
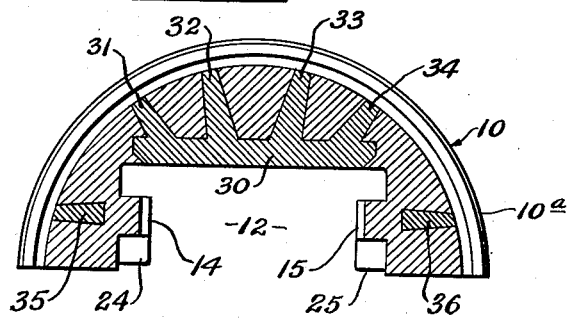
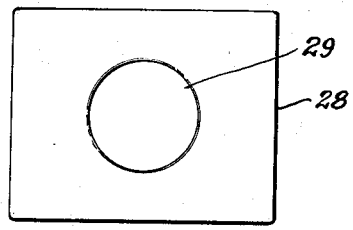
INVENTORS
LAWRENCE J. LITALIEN
BY JOSEPH DUTHAVECK
H. G. Manning
ATTORNEY Patented July 13, 1954

2,683,332

UNITED STATES PATENT OFFICE 2,683,332

GLASS MOLD HAVING A DETACHABLE TWO-PART INSERT

Lawrence J. Litalien, Waterbury, and Joseph Duthaveck, Hartford, Conn., assignors to Dutalite Company, Waterbury, Conn., a partnership Application January 5, 1953, Serial No. 329,612

6 Claims. (Cl. 49—68)

This invention relates to blank and blow molds for use in the manufacture of hollow glassware, such as bottles, jars, tumblers, etc.

One object of this invention is to produce a glass forming mold of the above nature constructed of exterior cast iron mold sections having detachable wear-resistant inserts, whereby a long mold life may be obtained.

A further object is to provide a mold of the above nature which will be standard for a plurality of sizes of glassware, and in which the mold may be used in various types of glass making machines.

A further object is to provide a mold of the above nature having high thermal conductivity, low thermal expansion, high resistance to grain growth and scaling, high resistance to wear, and also having efficient cooling fins embedded in and extending through the outer mold sections.

A further object is to provide a mold of the above nature in which the rate of heat transfer through the mold will be enhanced by the use of a copper filler having fins to conduct the heat from the insert to the outer surface of the mold body.

A further object is to provide a device of the above nature in which the inserts will be made from two complementary rectangular members, which are hard, tough and highly resistant to shock, wear and abrasion.

A further object is to provide a device of the above nature in which the inserts may be readily attached to and removed from the mold body, in order to avoid the necessity of making a complete mold for every size and shape of hollow glassware to be molded therein.

A further object is to provide a mold of the above nature in which the cooling of the glass in the mold will be very rapid due to the high heat conductivity of the copper filler plate and the fins for conducting the heat from the inserts to the exterior of the mold.

A further object is to provide a glass mold of the above nature which will be simple in construction, inexpensive to manufacture, easy to install and manipulate, compact, ornamental in appearance, and very efficient and durable in use.

With these and other objects in view, there has been illustrated on the accompanying drawings, one form in which the invention may conveniently be embodied in practice.

In the drawings,

Fig. 1 represents a top plan view of an improved mold with inserts in assembled position.

Fig. 2 is a side elevation of the same.

Fig. 3 is a plan view of the two part neck ring, shown separately.

Fig. 4 is a top plan view of the assembled mold, with the neck ring removed.

Fig. 5 is a vertical cross-sectional view, taken along the line 5—5 of Fig. 1, looking in the direction of the arrows.

Fig. 6 is a plan view of one of the semi-cylindrical cast iron mold sections.

Fig. 7 is an elevational view of the same.

Fig. 8 is a plan view of one of the insert members.

Fig. 9 is an elevational view of the same.

Fig. 10 is a cross-sectional view of one of the cast iron mold sections, taken along the line 10—10 of Fig. 7 looking in the direction of the arrows, and showing the shape of the copper cooling filler and fins.

Fig. 11 is a bottom plan view of the base plate of the mold.

Referring now to the drawings, in which like reference numerals denote corresponding parts throughout the several views, The numerals 10 and 11 indicate a pair of semi-cylindrical mold body members which preferably are constructed from "ASTM" specification, class 20 grey cast iron. Such a type of cast iron is "open grain" and has large graphite flake distribution in conjunction with low heat expansivity and high thermal conductivity.

The mold body members 10 and 11 are provided with aligned exterior semi-circular flanges 10a and 11b, and have interior cavities 12 and 13 of rectangular shape.

Extending into the opposite sides of the rectangular cavities 12 and 13, are two pairs of elongated tapered keys 14 and 15, 16 and 17 and said cavities are adapted to receive, with a sliding fit, a pair of rectangular inserts 18 and 19 having tapered side grooves 20, 21, 22 and 23, which interfit with the keys 14, 15, 16 and 17 previously mentioned. The inserts 18, 19 are preferably made from hard, tough, chill-cast iron or any other material which is highly resistant to shock, wear and abrasion.

Near the bottom of the cast iron mold body members 10 and 11, provision is made of two pairs of inwardly extending stop lugs 24 and 25 and 26 and 27, respectively, which limit the downward movement of the insert members 18 and 19 when they are forced into the cavities 12 and 13 of the mold body members 10 and 11.

Provision is also made of a rectangular bottom plate 28 (Figs. 5 and 11), having a raised circular center section 29 for interfitting with the hollow glassware W which is molded within the body members 10 and 11, and which takes its shape from the inserts 18 and 19.

In order to cool the molded glassware W rapidly after the molding is completed, provision is made of a pair of heat-conducting copper filler plates 30, embedded in the cast iron body members 10, 11 and having seven rows of spaced tapered ribs 31, 32, 33 and 34 respectively, arranged in four vertical columns as clearly shown in Fig. 7.

Provision is also made of two pairs of auxiliary lateral tapered cooling fillers 35, 36 embedded in the respective mold body members 10, 11 in alignment with the keys 14, 15, 16, 17. The fillers 30, 35, 36 have low thermal expansivity thus reducing strains and stresses in the molding process. By reason of the high thermal conductivity of the cooling filler members 30, 35, 36, heat will be transferred rapidly and uniformly from the outer surfaces of the inserts to the exterior of the mold.

The tapered keys 14–17, fitted within the grooves 20–23 produce a tight fit between the inserts 18, 19 due to the expansion of the hot glass therein, thus preventing said inserts from getting out of proper alignment.

Operation

In the operation of molding, the inserts 18 and 19 will be pushed down into the two part mold body members 10, 11 as far as they will go, until they strike the stops 24, 25, 26 and 27 on said body members.

To complete the assembly of the mold, a rectangular neck ring made of two parts 39 and 40 and having a central aperture 41 will then be placed at the open or upper end of the two-part mold, as shown in Fig. 5.

The bottom of the mold will then be closed by inserting the detachable rectangular bottom plate 28 upwardly into the body members 10, 11.

It is to be understood that after a glass gob 37 has been partially blown in a "blank" mold, not shown, it will be inverted and transferred to the "blow" mold herein disclosed with a partially-blown cavity 38 formed within the gob 37.

The remainder of the glass blowing operation will take place within the cavity 42 of the blow mold, producing an article of hollow glassware W having uniform thickness and conforming closely to the shape of the interior of the insert sections 18 and 19 respectively.

One advantage of the present invention is that a single two-part outer cast iron mold may be used for receiving any number of inserts which have the same exterior dimensions and which are provided with cavities of different sizes corresponding to the exterior shape of the bottles, jars, or other glassware articles to be molded.

Other advantages of this invention are its simplicity, its low cost, and the rapid cooling of the molded glassware by the use of the copper filler plate and fins which conduct the heat rapidly to the exterior of the mold.

A further advantage is that the tightly fitted insert members will minimize extrusions and flash.

It will be understood that the insert mold herein disclosed is not limited to use in a "blow mold" but may also be employed in a "blanking" mold, a "parison" mold, or in a "press and blow" mold, etc. within the spirit and scope of the present invention.

A further advantage is that the inserts may be removed from the outer mold sections without removing the latter from the glass molding machine, thus facilitating changing from one job or size of glassware to another. In fact, as many as five different sizes may be made without changing the outer mold sections.

While there has been disclosed in this specification one form in which the invention may be embodied, it is to be understood that this form is shown for the purpose of illustration only, and that the invention is not limited to the specific disclosure, but may be modified and embodied in various other forms without departing from its spirit. In short, the invention includes all the modifications and embodiments coming within the scope of the following claims.

Having thus fully described the invention what is claimed as new and for which it is desired to secure Letters Patent is:

1. In a mold for making a hollow article of glassware, a pair of substantially semi-cylindrical outer cast iron body members, each of said members having a rectangular cavity with a flat base parallel to the abutting jaws of said mold members, a pair of inwardly extending aligned elongated tapered keys on the sides of said cavities, a slidable rectangular detachable insert in each of said cavities and provided with opposed aligned tapered grooves interfitted with said keys, the abutting inner faces of said inserts having cavities which give the final shape to the glassware blown in said mold and a pair of elongated heat conducting fillers embedded in each body member in abutment with said inserts, said fillers having cooling ribs extending out to the circumference of said body members.

2. A mold as defined in claim 1, in which a two-part detachable rectangular neck is located at the top thereof, resting upon said inserts, and a solid one-piece rectangular base plate is located below said inserts in abutment therewith.

3. A mold as defined in claim 1, in which said cooling ribs are tapered and are arranged in a plurality of rows.

4. A mold as defined in claim 3, in which two pairs of outwardly extending auxiliary tapered high heat-conducting lateral fins are embedded in said body members in alignment with said keys.

5. A mold as defined in claim 1, in which the cavities in said mold members have inwardly extending stop lugs adjacent their lower ends to limit the downward sliding movement of said inserts.

6. A mold as defined in claim 1, in which both of said mold body members have semi-circular outwardly-extending aligned annular flanges intermediate the upper and lower ends thereof.

References Cited in the file of this patent

UNITED STATES PATENTS

| Number | Name | Date |
|---|---|---|
| 1,559,394 | Williams | Oct. 27, 1925 |
| 1,609,708 | Gilligan | Dec. 7, 1926 |
| 1,894,243 | Rohrich et al. | Jan. 10, 1933 |
| 1,910,015 | Homand | May 23, 1933 |

FOREIGN PATENTS

| Number | Country | Date |
|---|---|---|
| 114,815 | Germany | Nov. 9, 1900 |